United States Patent
Kidono et al.

(10) Patent No.: US 6,784,938 B1
(45) Date of Patent: Aug. 31, 2004

(54) ELECTRONIC CAMERA

(75) Inventors: Masami Kidono, Tachikawa (JP); Hitoshi Hashimoto, Sagamihara (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/166,452

(22) Filed: Oct. 5, 1998

(30) Foreign Application Priority Data

Oct. 8, 1997 (JP) ............................................. 9-275931

(51) Int. Cl.[7] ....................... H04N 5/238; H04N 5/235; G03B 15/02; G03B 7/00
(52) U.S. Cl. ...................... 348/364; 348/362; 348/363; 396/61; 396/235
(58) Field of Search ............................... 348/362, 363, 348/364, 358; 396/61, 63, 235, 245, 246, 250, 256

(56) References Cited

U.S. PATENT DOCUMENTS

| | | | | |
|---|---|---|---|---|
| 4,959,728 A | * | 9/1990 | Takahashi et al. | 348/363 |
| 5,032,863 A | * | 7/1991 | Date et al. | 348/363 |
| 5,223,935 A | * | 6/1993 | Tsuji et al. | 348/364 |
| 5,335,075 A | * | 8/1994 | Komiya et al. | 348/298 |
| 5,682,562 A | * | 10/1997 | Mizukoshi et al. | 396/159 |
| 5,774,750 A | * | 6/1998 | Honda | 396/159 |
| 5,999,752 A | * | 12/1999 | Ueyama et al. | 396/235 |
| 6,002,429 A | * | 12/1999 | Ochi et al. | 348/207.1 |
| 6,115,553 A | * | 9/2000 | Iwamoto | 396/104 |
| 6,118,944 A | * | 9/2000 | Sato et al. | 396/61 |
| 6,160,581 A | * | 12/2000 | Higashihara et al. | 348/364 |
| 6,486,503 B1 | * | 11/2002 | Fossum | 257/215 |

FOREIGN PATENT DOCUMENTS

| | | | | |
|---|---|---|---|---|
| JP | 5-236338 | | 9/1993 | |
| JP | 6-178198 | | 6/1994 | |
| JP | 06-178198 | * | 6/1994 | H04N/5/243 |
| JP | 06178198 A | * | 6/1994 | H04N/5/243 |

* cited by examiner

*Primary Examiner*—Wendy R. Garber
*Assistant Examiner*—Lin Ye
(74) *Attorney, Agent, or Firm*—Ostrolenk, Faber, Gerb & Soffen, LLP

(57) ABSTRACT

An electronic camera of the present invention includes a CCD, a diaphragm, an EEPROM, and a CPU. The CCD has a condenser micro-lens opposed to a light receptor. The diameter of the diaphragm is variable in relation to a plurality of f-numbers. In the EEPROM, data items of outputs of the CCD associated with the plurality of f-numbers or ratios of the outputs are stored in advance. The CPU calculates an exposure time according to an output of the CCD associated with a given f-number, controls exposure, and corrects an exposure time according to data stored in the EEPROM during recording.

2 Claims, 5 Drawing Sheets

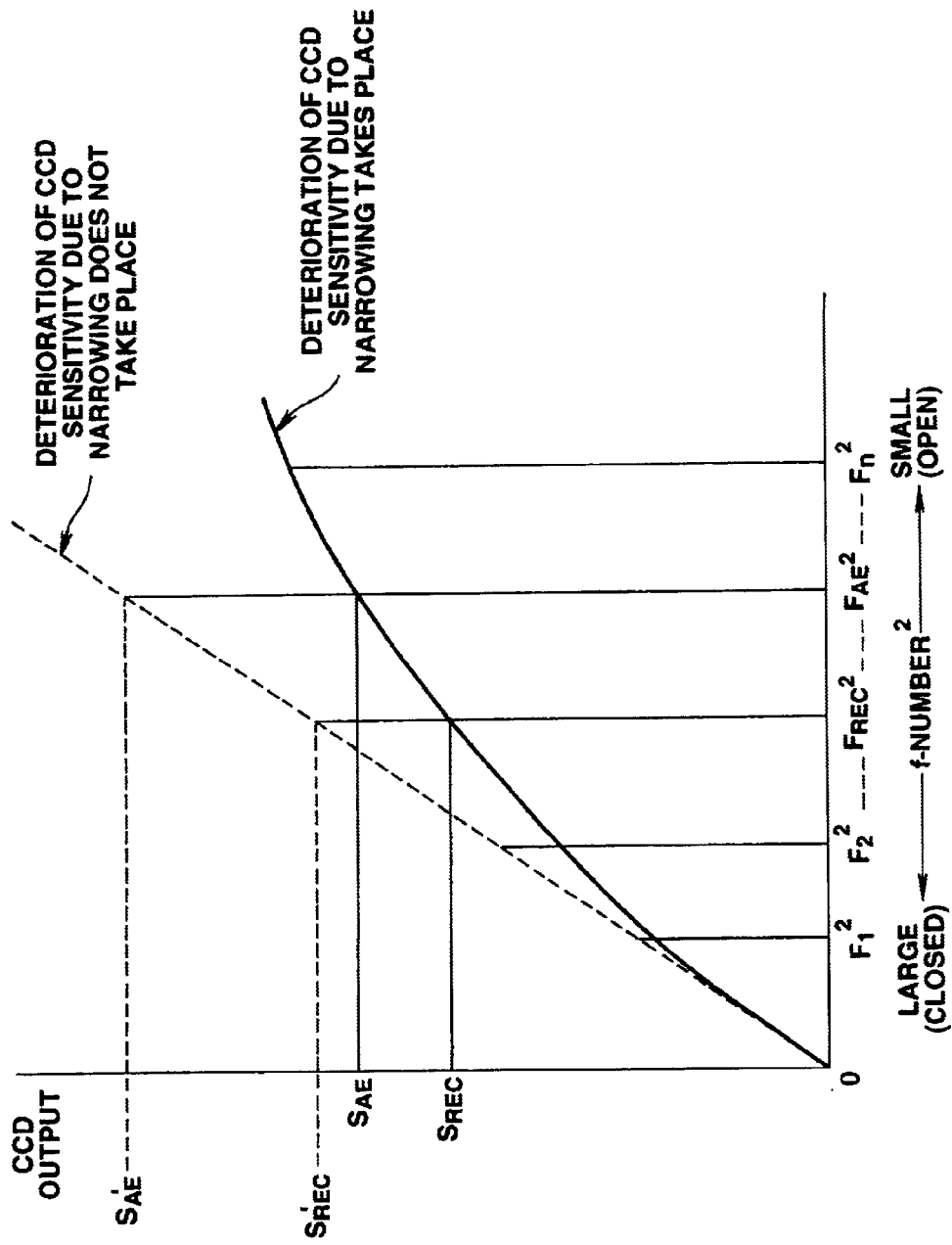

ELECTRONIC CAMERA

BACKGROUND OF THE INVENTION

1. Field of the Invention

The present invention relates to an electronic camera, or more particularly, to an electronic camera for automatically controlling exposure by utilizing an output of a solid-state imaging device.

2. Description of the Related Art

In the past, a digital camera capable of automatically controlling exposure by utilizing an output of a solid-state imaging device such as a CCD, in other words, capable of carrying out AE imaging has been known.

For example, a TV camera composed of a solid-state imaging device, a diaphragm, and a video signal amplifier has been disclosed in Japanese Unexamined Patent Publication No. 5-236338. The solid-state imaging device has a condenser micro-lens located near a light receptor. The diaphragm controls an amount of light incident on the solid-state imaging device. To the video signal amplifier, a video signal is supplied from the solid-state imaging device. When an output of the solid-state imaging device exhibits an average voltage level, the TV camera guarantees a minimum illuminance for an object irrespective of whether the diaphragm has been changed in diameter.

This TV camera detects an f-number, i,e., information about the zoom position and corrects the gain.

On the other hand, a technological means for correcting a change in sensitivity of a solid-state imaging device by adjusting the setting of an f-number for a camera lens has been disclosed in Japanese Unexamined Patent Publication No. 6-178198.

The technological means stores sensitivity levels associated with f-numbers as data items in relation to a plurality of solid-state imaging devices, and corrects the gain according to the diameter of the aperture.

However, in this type of digital camera which performs AE imaging, as the diaphragm for the micro-lens attached to the CCD is opened more widely, the sensitivity of the CCD tends to deteriorate. When photography (recording) is started in response to a shutter trigger, if the diaphragm is changed in diameter from a previous setting, an error proportional to the change in sensitivity of the CCD occurs in exposure precision. If the gain is adjusted in order to correct the exposure precision as proposed by the prior art, there arises a problem in that the noise of an image to be recorded becomes intensified.

FIG. 5 is a graph indicating voltage levels of outputs of a CCD or a solid-state imaging device associated with different f-number settings for AE imaging carried out by a conventional digital camera employing a solid-state imaging device. Table 1 demonstrates the relationship between an f-number setting for AE imaging and an f-number setting for real exposure.

TABLE 1

| Relationship between an f-number setting for AE imaging and an f-number setting for real exposure | Exposure level for a picture to be recorded |
|---|---|
| $F_{AE} < F_{REC}$ (Diaphragm to be narrowed for real exposure) | Overexposure relative to a proper level |

TABLE 1-continued

| $F_{AE} > F_{REC}$ (Diaphragm to be opened for real exposure) | Underexposure relative to a proper level |
|---|---|

As shown in FIG. 5, assume that when the sensitivity of a CCD does not deteriorate as the diaphragm is narrowed; AE imaging is carried out with a designated f-number FAE. A shutter speed TAE is found to provide a proper exposure level (brightness). Thereafter, real exposure (recording) is carried out with the f-number changed to FREC in response to a shutter trigger. In this case, a shutter speed TREC providing the proper exposure level is expressed as follows:

$$\begin{aligned} TREC &= TAE \times (FREC / FAE)2 \\ &= TAE \times (S'AE/S'REC) \end{aligned}$$

On the other hand, when the CCD sensitivity decreases upon diaphragm narrowing, if real exposure (recording) were to be carried out by designating a shutter speed calculated according to the above expression, the exposure level would be deviated from the proper value.

SUMMARY OF THE INVENTION

The first object of the present invention is to provide an electronic camera capable of carrying out a proper exposure or recording irrespective of the sensitivity of a solid-state imaging device.

The second object of the present invention is to provide an electronic camera capable of, although the camera may have zoom capacity, carrying out exposure or recording with a high level of precision irrespective of the sensitivity of a CCD.

Briefly, an electronic camera of the present invention comprises a CCD, a diaphragm, an EEPROM, and a CPU. The CCD has a condenser micro-lens opposed to a light receptor. The diaphragm is variable in relation to a plurality of f-numbers. In the EEPROM, data items of outputs of the CCD associated with the plurality of f-numbers or ratios of the outputs thereof are stored in advance. The CPU calculates an exposure time according to an output of the CCD associated with a given f-number, control the exposure, and corrects the exposure time according to data stored in the EEPROM during recording.

BRIEF DESCRIPTION OF THE DRAWINGS

FIG. 5 is a graph indicating voltage levels of outputs of a CCD or a solid-state imaging device associated with various f-number settings for AE imaging carried out by a conventional digital camera employing a solid-state imaging device.

DESCRIPTION OF THE PREFERRED EMBODIMENTS

Figure 1:
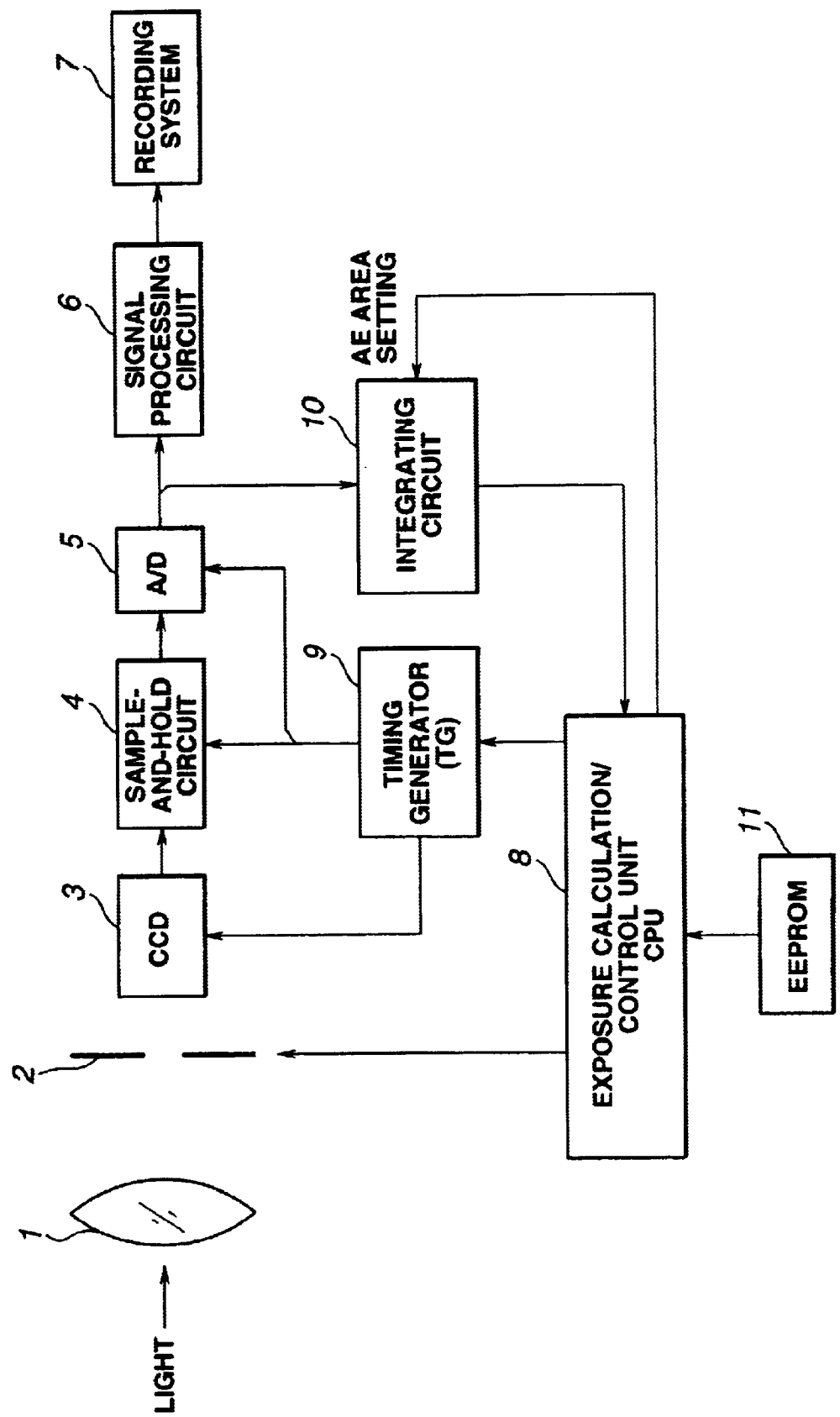
FIG. 1 is a block diagram showing a configuration of the major portion of an electronic camera in accordance with a first embodiment of the present inventions.

Referring to the drawings, embodiments of the present invention will be described below.

FIG. 1 is a block diagram showing a configuration of the major portion of an electronic camera in accordance with a first embodiment of the present invention.

As illustrated, the electronic camera of the first embodiment is comprised mainly of a CPU 8, a photographic lens 1, a diaphragm 2, a solid-state imaging device 3, a sample-and-hold circuit 4, an A/D converter 5, a signal processing circuit 6, a memory 7, a timing generator (TG) 9, an integrating circuit 10, and an EEPROM 11. Specifically, the CPU 8 calculates an exposure value, controls the exposure, and is responsible for the control of all circuits in the camera. The photographic lens 1 receives light that carries an object image. The diaphragm 2 is located behind the photographic lens 1. The solid-state imaging device 3 such as a CCD projects the object image carried by incident light, and has the capability of an electronic shutter. The sample-and-hold circuit 4 samples and holds a picture signal produced by the imaging device 3. The A/D converter 5 converts a signal sent from the sample-and-hold circuit 4 from an analog form to a digital form. The signal processing circuit 6 processes the output signal of the A/D converter 5 to optimize a rendered image. The memory 7 stores the picture data sent from the signal processing circuit 6. The timing generator (TG) 9 generates a timing signal used to drive the CCD 3 under the control of the CPU 8. The integrating circuit 10 integrates the picture data sent from the A/D converter 5 according to an AE area specified by the CPU 8. In the EEPROM 11, sensitivity levels of the CCD or CCD sensitivity ratios associated with f-numbers are written as adjustment values during adjustment of the electronic camera.

An exposure error correcting operation for adjusting to a change in CCD sensitivity ratio in the electronic camera of the first embodiment having the foregoing components will be described below.

For adjusting the electronic camera, sensitivity levels of the CCD or CCD sensitivity ratios (outputs or ratios of outputs) associated with various f-numbers are written as adjustment values in the EEPROM 11 in advance.

Figure 2:
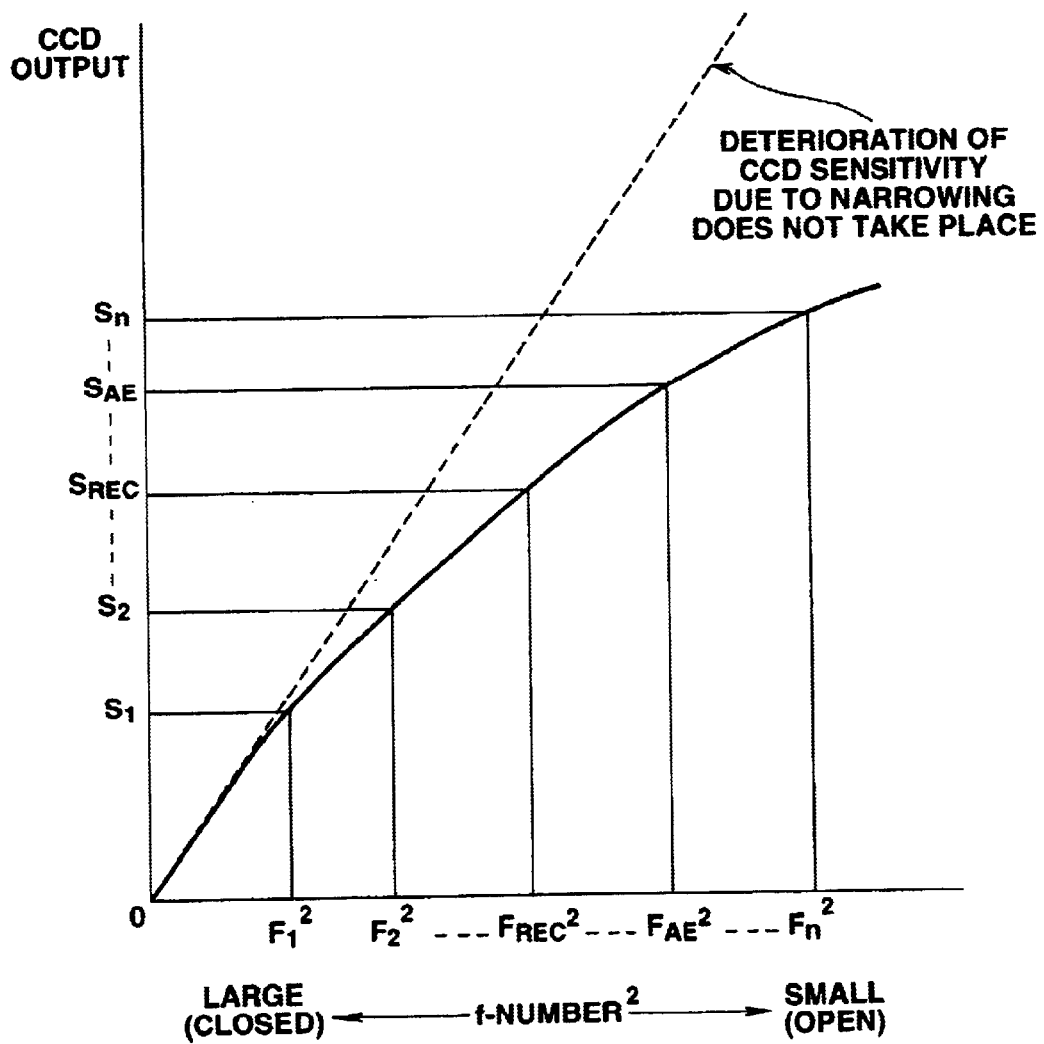
FIG. 2 is a graph indicating voltage levels of outputs of a CCD or a solid-state imaging device associated with various f-number settings for AE imaging carried out by the electronic camera of the first embodiment.

FIG. 2 is a graph indicating voltage levels of outputs of the CCD, which is a solid-state imaging device, associated with different f-number setting for AE imaging in the electronic camera of the first embodiment. Table 2 is a listing of CCD sensitivity ratios associated with various f-numbers stored in advance in the EEPROM 11.

TABLE 2

| f-number | CCD output |
|---|---|
| F1 | S1 |
| F2 | S2 |
| F3 | S3 |
| . | . |
| . | . |
| . | . |
| Fn | Sn |

The data items of CCD sensitivity ratios are obtained by measuring the voltage level of an output of the CCD. The voltage level of an output of the CCD is measured by varying the f-number setting in a camera from F1 to Fn ($n \geq 2$). For each measurement, the camera is used to image an object whose brightness is constant.

Moreover, when the f-number can be varied continuously from F to F', an intermediate value between S and S' may be found by performing linear interpolation. In other words, the value of a function between S and S' is found by fitting a curve close to S and S' on the assumption that the three plotted points lie on a straight line. With this capability, the storage capacity of the EEPROM 11 may be small.

In determining the exposure conditions at the time of photographing (recording), an exposure error resulting from a change in CCD sensitivity is corrected based on the CCD sensitivity ratios.

Assume that a shutter speed designated to carry out AE imaging with a selected f-number of FAE, and a shutter speed designated to carry out real exposure (recording) with a selected f-number of FREC have the following relationship:

$$TREC = TAE \times (SAE/SREC)$$

In this manner, recording can be achieved so that proper brightness so that recording will be unaffected by deterioration of CCD sensitivity resulting from narrowing the diaphragm.

As mentioned above, according to the electronic camera of the first embodiment, exposure or recording can be carried out with a high level of precision irrespective of the CCD sensitivity level.

Next, a second embodiment of the present invention will be described.

Figure 3:
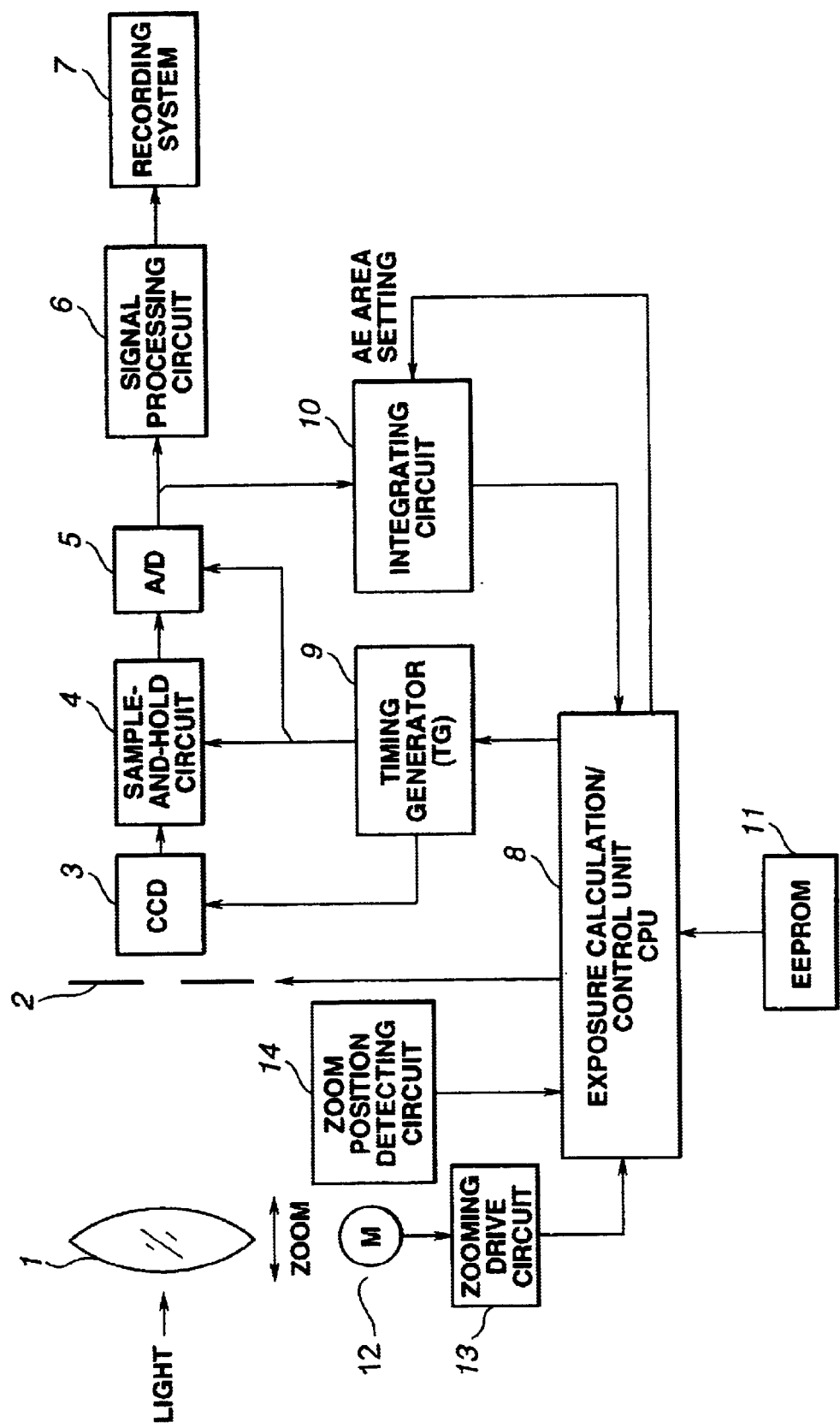
FIG. 3 is a block diagram showing a configuration of the major portion of an electronic camera in accordance with a second embodiment of the present invention.

FIG. 3 is a block diagram showing a configuration of the major portion of an electronic camera in accordance with the second embodiment of the present invention. The same reference numerals will be assigned to components identical to those of the first embodiment.

The electronic camera of the second embodiment is an electronic camera having a zoom capacity. In addition to the same components as those of the first embodiment, the electronic camera includes a zoom motor 12, a zooming drive circuit 13, and a zoom position detecting circuit 14. The zoom motor 12 drives the photographic lens 1 for zooming. The zooming drive circuit 13 drives and controls the zoom motor 12 under the control of the CPU 8. The zoom position detecting circuit 14 detects a zoom position or a position at which the photographic lens 1 is located to zoom an image.

An exposure error correcting operation for adjusting to a change in CCD sensitivity ratio in the electronic camera of the second embodiment having the foregoing components will be described below.

For adjusting the electronic camera, CCD sensitivity levels or CCD sensitivity ratios (outputs or ratios of outputs) associated with various f-numbers are written in advance as adjustment values in the EEPROM 11. The electronic camera of this embodiment is a zoom camera. In general, the f-number is varied depending on whether the photographic lens is located at whichever of a telephoto position (ZT) or a wide-angle position (ZW). CCD sensitivity ratios (Swn and STn) associated with the f-numbers relevant to the telephoto position and wide-angle position are therefore written in the EEPROM 11.

Figure 4:
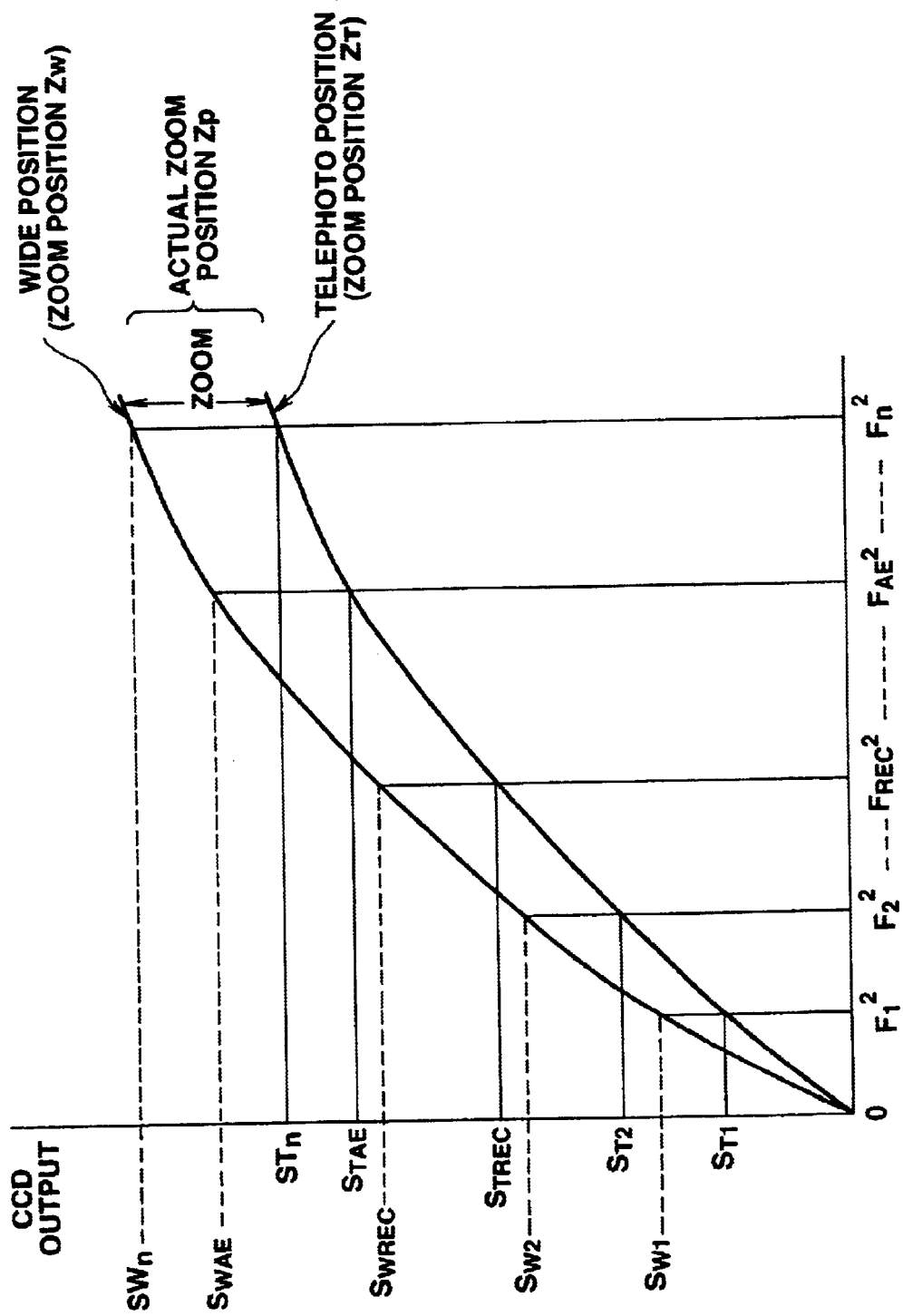
FIG. 4 is a graph indicating voltage levels of outputs of a CCD or a solid-state imaging device associated with various f-number setting for AE imaging carried out by the electronic camera of the second embodiment.

FIG. 4 is a graph indicating voltage levels of outputs of the CCD, which is a solid-state imaging device, associated with various f-numbers setting for AE imaging in the electronic camera in accordance with the second embodiment. Table 3 is a listing of CCD sensitivity ratios associated with various f-numbers and stored in advance in the EEPROM 11.

TABLE 3

| | Voltage level of a CCD output | | |
|---|---|---|---|
| f-number | Wide-angle position ZW | ZP* | Telephoto position ZT |
| F1 | SW1 | SP1 | ST1 |
| F2 | SW2 | SP2 | ST2 |
| . | . | . | . |
| . | . | . | . |
| . | . | . | . |
| Fn | SWn | SPn | STn |

*Note: SPn associated with Fn relevant to ZP is not stored in the EEPROM but calculated by performing linear interpolation on SWn and STn.

In this embodiment, the CCD sensitivity ratios (SWn and STn) associated with the f-numbers relevant to the telephoto position (ZT) and wide-angle position (ZW) are stored in the EEPROM 11. Moreover, assume that a zoom position is a given position (ZP) between the telephoto position and wide-angle position. That is, the zoom position is neither the telephoto position nor wide-angle position but is an intermediate position. A CCD sensitivity ratio (SPn) associated with an f-number (Fn) relevant to the zoom position is linearly interpolated using the adjustment values relevant to the telephoto and wide-angle positions in consideration of zoom position information.

The CCD sensitivity ratio (SPn) associated with the f-number (Fn) relevant to the given zoom position (ZP) can be calculated according to the expression below. Namely, assuming that the zoom position is ZP, the voltage level of a CCD output, SPn, is linearly interpolated according to the following expression:

$$SPn = STn + (SWn - STn) \times |(ZP - ZT)/(ZW - ZT)|$$

where n is 1 when an f-number is F1, while n is 2 when the f-number is F2, etc.

For determining an exposure condition at the time of photographing (recording), the exposure error resulting from a change in CCD sensitivity is corrected based on the CCD sensitivity ratios.

Specifically, a shutter speed providing a proper exposure level (brightness) is designated as TAE. Assume that real exposure (recording) is carried out with an f-number set to FREC in response to a shutter trigger. The shutter speed at this time is designated as TREC. The shutter speed to be designated for real exposure is calculated based the CCD sensitivity ratios according to the expression below.

$$TREC = TAE \times (SPAE/SPREC)$$

Moreover, when a potentiometer or stepping motor is employed the an actual zoom position can be defined based on the number of driving steps.

As mentioned above, according to the electronic camera of the second embodiment, although the camera has a zoom capacity, exposure or recording can be achieved with a high level of precision irrespective of a CCD sensitivity level.

As described so far, according to the present invention, there is provided an electronic camera capable of achieving exposure or recording properly irrespective of the sensitivity off it's solid-state imaging device.

In the present invention, it is apparent that a wide range of different embodiments can be constructed based on the disclosed description without a departure from the spirit or scope of the present invention. The present invention will be limited by appended claims but not restricted the embodiments discussed herein.

What is claimed is:

1. An electronic camera, comprising:

a solid-state imaging device having a condenser microlens opposed to a light receptor for recording an image, said solid-state imaging device having a sensitivity parameter that varies with f-number settings of the electronic camera;

a diaphragm having a diameter which is variable in relation to a plurality of f-numbers for controlling exposure of light to said solid-state imaging device;

a zoom lens which can be driven between a telephoto position and a wide-angle position;

a zoom lens position detector for detecting position information of said zoom lens;

a memory for storing either data items of outputs of said solid-state imaging device which are associated with said plurality of f-numbers and obtained when said zoom lens is positioned at said telephoto position and said wide-angle position, or data items of ratios of the outputs, both said data items reflecting variations of the sensitivity parameter relative to the f-number settings;

an exposure controller for calculating an exposure time according to an output of said solid-state imaging device associated with a given f-number, and for controlling exposure of light to said solid-state imaging device through said diaphragm;

a linear interpolator that serves to obtain outputs of the solid-state imaging device or ratios of the outputs relative to a zoom position intermediate the telephoto position and wide-angle position, based on data stored in the memory;

a correcting algorithm for detecting an output of said solid-state imaging device or a ratio of the output according to position information of said zoom lens which is detected by said zoom lens position detector and according to the data items stored in said memory during recording of said image, and for correcting the exposure time calculated by said exposure controller according to an output of said solid-state imaging device or to the ratio of the output; and a calculator that calculates a sensitivity ratio (SPn) for a zoom position (ZP), taking into consideration a telephoto position (ZT) and a wide-angle position (ZW) and STn and SWn are sensitivity ratios associated with F-numbers according to the expression: $SPn = STn + (SWn - STn)(ZP - ZT)/(ZW - ZT)$.

2. An electronic camera comprising:

a solid-state imaging device having a condenser microlens opposed to a light receptor;

a diaphragm whose diameter is variable in relation to a plurality of f-numbers;

a zoom lens for receiving light that renders an object image to be driven to a telephoto position or wide-angle position;

a zoom lens position detecting means for detecting position of information of the zoom lens;

an exposure condition setting means for determining an f-number and an exposure time by full aperture metering during preparatory operation to capture a still image;

an f-number setting means for setting an f-number of the diaphragm of the photographic lens to be the f-number determined by the exposure condition setting means when starting the exposure;

an exposure time correcting means for correcting the exposure time according to the f-number when starting the exposure; and wherein the exposure time correcting means includes a calculator that calculates a sensitivity ratio ($SP_n$) for a zoom position (ZP), taking into consideration a telephoto position (ZT) and a wide-angle position (ZW) and $ST_n$ and $SW_n$ are sensitivity ratios associated with F-numbers according to the expression: $SP_n=ST_n+(SW_n-ST_n)(ZP-ZT)/(ZW-ZT)$.

* * * * *